No. 676,672. Patented June 18, 1901.
J. BAUMHOER.
LUBRICATOR.
(Application filed Feb. 27, 1901.)
(No Model.)
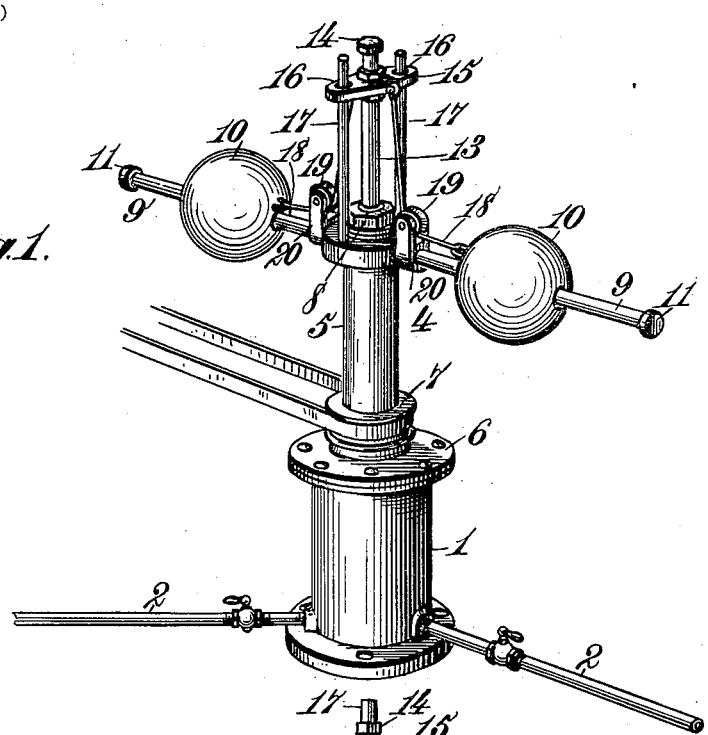
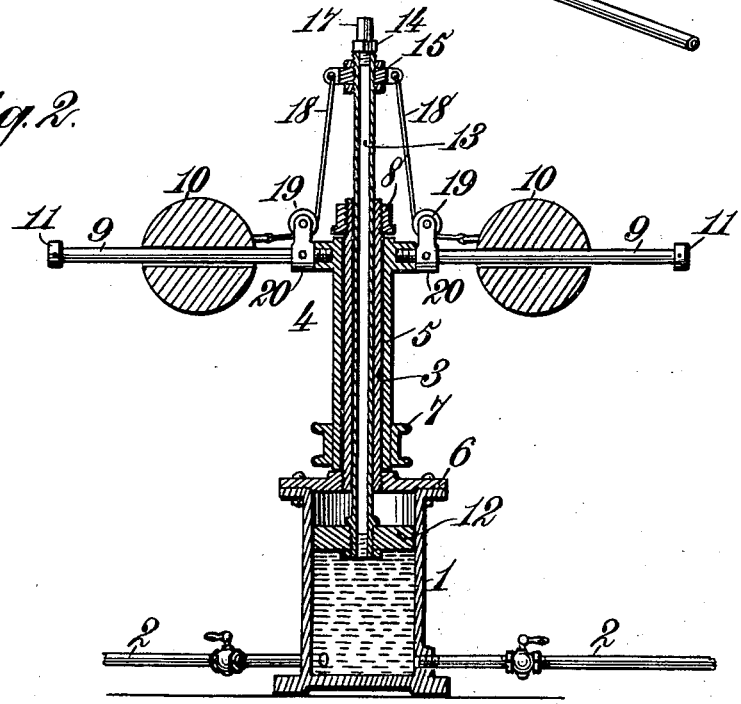
Witnesses.
Robert Everett
Geo. W. Rea
Inventor:
John Baumhoer,
By James L. Norris,
Atty.
THE NORRIS PETERS CO., PHOTO-LITHO., WASHINGTON, D. C.

UNITED STATES PATENT OFFICE.

JOHN BAUMHOER, OF KOELTZTOWN, MISSOURI.

LUBRICATOR.

SPECIFICATION forming part of Letters Patent No. 676,672, dated June 18, 1901.

Application filed February 27, 1901. Serial No. 49,112. (No model.)

*To all whom it may concern:*

Be it known that I, JOHN BAUMHOER, a citizen of the United States, residing at Koeltztown, in the county of Osage and State of Missouri, have invented new and useful Improvements in Lubricators, of which the following is a specification.

My invention relates to lubricators, the object of the same being to provide novel means whereby oil or other liquid lubricating material may be forced under pressure from a storage tank, cylinder, or other source of supply to the bearings or working parts of a machine.

The invention consists of a cylinder or supply-tank, a distributing pipe or pipes leading therefrom, a piston longitudinally movable in said cylinder behind the lubricating material therein, a rotary part adapted to be driven from any suitable source of power, laterally-movable balls or weights thereon adapted to be thrown outwardly by centrifugal force, and connections between said balls or weights and said piston.

The invention also consists in certain features and details of construction and combinations of parts, which will be hereinafter more fully described and claimed.

In the drawings forming part of this specification, Figure 1 is a perspective view illustrative of my invention, and Fig. 2 is a vertical sectional view of the same.

Like reference-numerals indicate like parts in both views.

The cylinder or tank 1, into which the oil or other lubricating material is introduced, has leading therefrom adjacent to its lower end one or more distributing-pipes 2 for conveying the lubricating material to the bearings or other working parts of a piece of machinery. Secured to the cylinder 1 and extending upwardly therefrom is an extension or bearing-sleeve 3, and surrounding said sleeve 3 is a rotary part 4, the same comprising a sleeve 5, which has bearings on the sleeve 3 and is adapted to engage a flange 6, formed upon the lower end of the sleeve 3. Secured to or formed integral with the sleeve 5 is a pulley 7, around which a driving-belt may be passed for the purpose of rotating the sleeve 5 and the parts connected therewith. Upward movement of the rotary part 4 is prevented by a collar 8, which is secured to the bearing-sleeve 3. Secured to the head of the rotary part 4 and projecting radially therefrom are arms 9 9, upon which are slidingly mounted the balls or weights 10, the outer ends of said arms 9 being provided with knobs or projections 11 for limiting the outward movement of said balls or weights.

Fitting within the cylinder 1 and located above or behind the lubricating material therein is a piston 12, which is adapted to be moved downwardly for the purpose of forcing the lubricating material from the cylinder 1 out through the distributing-pipes 2. The piston 12 has secured thereto and extending upwardly therefrom a hollow piston-rod 13, which passes through and has bearings in the bearing-sleeve 3. The said piston-rod communicates with the under side of the piston 12, so that the cylinder 1 may be filled or supplied with lubricating material through said piston-rod. The upper end thereof is closed by a cap or plug 14, as clearly shown. Secured to the piston-rod 13, adjacent to its upper end, is a cross-head 15, which is provided with slots 16 therein, through which pass the stationary guide-rods 17, secured to the head or upper end of the sleeve 5. Connected to the cross-head 15 are the chains or cords 18, which pass around the guide-pulleys 19 and are connected at their opposite ends to the balls or weights 10. The pulleys 19 are mounted in brackets 20, connected with the radial arms 9.

In using my device the cylinder or tank 1 is first filled with oil or other lubricating material. This may be done, as heretofore stated, by introducing the oil through the hollow piston-rod 13 after the cap or plug 14 has been removed. I do not, however, limit myself to this particular means of filling the cylinder 1, as other means might be employed instead. When the cylinder 1 is filled, the piston 12 therein is of course in its uppermost position, and the cap or plug 14 has been returned to its place, closing the upper end of the piston-rod 13. Upon now applying power to the rotary part 4 by any suitable means the same is caused to turn and the balls or weights 10 are thrown outwardly by centrifugal force. This action through the cords or chains 18 and the pulleys 19 forces down the piston 12, to which said cords or chains 18 are connected, and causes the oil or other lubricating material to be discharged from the cylinder 1 into the distributing pipe or pipes 2 and thence delivered to the bearings or other working parts of the machine to be lubricated. It is preferred that the rotary part 4 be connected up through the pulley 6 with the engine or other machine to be lubricated, so that when said engine or machine ceases to operate the flow of lubricating material to the bearings thereof will be automatically stopped. Said rotary part 4 may, however, be turned from a separate motor or machine without departing from my invention.

While my invention is particularly designed for forcing lubricating material under pressure, I desire it to be understood that I do not limit myself to this use, as the same may be employed for forcing liquids from a source of supply to a point where they are to be used.

The distributing-pipes 2 may be provided with suitable valves for controlling the flow of lubricating material therethrough and for preventing the return of the lubricating material to the tank or cylinder 1 during the filling operation.

Having now described my invention, what I claim as new, and desire to secure by Letters Patent, is—

1. The combination with a tank or cylinder and a distributing-pipe leading therefrom, of a piston in said cylinder, a rotary part mounted to turn independently of said tank on an extension thereof, weights on said rotary part adapted to be thrown outwardly by centrifugal force, and connections between said weights and said piston, whereby the latter may be forced longitudinally in said tank or cylinder, as and for the purpose set forth.

2. The combination with a tank or cylinder and a distributing-pipe leading therefrom, of a piston in said cylinder, a rotary part mounted to turn independently of said tank on an extension thereof, weights on said rotary part adapted to be thrown outwardly by centrifugal force, and flexible connections between said weights and said piston, whereby the latter may be forced longitudinally in said tank or cylinder, as and for the purpose set forth.

3. The combination with a tank or cylinder and a distributing-pipe leading therefrom, of a piston in said cylinder, a rotary part, radially-extending arms thereon, balls or weights slidingly mounted on said arms and adapted to be thrown outwardly by centrifugal force, and connections between said balls or weights and said piston, whereby the latter may be forced longitudinally in said tank or cylinder, as and for the purpose set forth.

4. The combination with a tank or cylinder and a distributing-pipe leading therefrom, of a bearing-sleeve secured to the upper end of said cylinder, a rotary part mounted to turn on said sleeve, radially-extending arms on said rotary part, balls or weights slidingly mounted on said arms and adapted to be thrown outwardly by centrifugal force, a piston in said tank or cylinder, a piston-rod secured thereto and extending upwardly through said bearing-sleeve, and connections between said balls or weights and said piston-rod whereby said piston may be forced longitudinally in said tank or cylinder, as and for the purpose set forth.

5. The combination with a tank or cylinder and a distributing-pipe leading therefrom, of a bearing-sleeve secured to the upper end of said cylinder, a rotary part mounted to turn on said sleeve, radially-extending arms on said rotary part, balls or weights slidingly mounted on said arms and adapted to be thrown outwardly by centrifugal force, a piston in said tank or cylinder, a piston-rod secured thereto and extending upwardly through said bearing-sleeve, pulleys connected with said arms, and cords or chains secured to said balls or weights and to said piston-rod and passing around said pulleys, whereby said piston may be forced longitudinally in said tank or cylinder, as and for the purpose set forth.

6. The combination with a tank or cylinder and a distributing-pipe leading therefrom, of a bearing-sleeve secured to the upper end of said cylinder, a rotary part mounted to turn on said sleeve, and having a pulley thereon, radially-extending arms secured to said rotary part, balls or weights slidingly mounted on said arms and adapted to be thrown outwardly by centrifugal force, guide-rods secured to said rotary part, a piston in said tank or cylinder, a piston-rod secured thereto and extending upwardly therefrom through said bearing-sleeve, a cross-head secured to the upper end of said piston-rod having openings therein through which said guide-rods project, brackets on said arms, antifriction-rollers therein, and cords or chains secured to said balls or weights and to said cross-head and passing around said antifriction-rollers, whereby said piston may be moved longitudinally in said tank or cylinder, as and for the purpose set forth.

In testimony whereof I have hereunto set my hand in presence of two subscribing witnesses.

JOHN BAUMHOER.

Witnesses:
SIMON C. SCHELL,
GEO. W. SCHELL.